United States Patent
Pridham et al.

(10) Patent No.: US 7,050,286 B2
(45) Date of Patent: May 23, 2006

(54) COMPOSITE STRUCTURE LIGHTING PROTECTION

(75) Inventors: Barry John Pridham, Lytham St Annes (GB); Michael John Bowery, Fort Worth, TX (US)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 10/502,013

(22) PCT Filed: May 17, 2004

(86) PCT No.: PCT/GB2004/002105

§ 371 (c)(1),
(2), (4) Date: Jul. 20, 2004

(87) PCT Pub. No.: WO2004/106160

PCT Pub. Date: Dec. 9, 2004

(65) Prior Publication Data

US 2005/0103936 A1 May 19, 2005

(30) Foreign Application Priority Data

May 30, 2003 (EP) ................................. 03253384
May 30, 2003 (GB) ................................. 0312339

(51) Int. Cl.
*H05F 3/00* (2006.01)
(52) U.S. Cl. ........................................ 361/218; 244/1 A
(58) Field of Classification Search ................. 361/218; 244/1 A, 121, 132
See application file for complete search history.

(56) References Cited

U.S. PATENT DOCUMENTS

| 3,755,713 | A | * | 8/1973 | Paszkowski | 361/218 |
| 4,479,163 | A | * | 10/1984 | Bannink et al. | 361/218 |
| 4,628,402 | A | | 12/1986 | Covey | 361/218 |
| 4,630,168 | A | * | 12/1986 | Hunt | 361/218 |
| 4,681,497 | A | * | 7/1987 | Berecz | 411/377 |
| 4,755,904 | A | * | 7/1988 | Brick | 361/117 |
| 4,760,493 | A | * | 7/1988 | Pearson | 361/218 |
| 4,789,918 | A | | 12/1988 | Bannink, Jr. | 361/218 |
| 4,888,451 | A | * | 12/1989 | Toni et al. | 174/94 R |
| 4,891,732 | A | * | 1/1990 | Jones | 361/218 |
| 4,912,594 | A | | 3/1990 | Bannink, Jr. et al. | 361/218 |
| 5,845,872 | A | * | 12/1998 | Pridham et al. | 244/1 A |
| 6,327,132 | B1 | * | 12/2001 | Andrivet et al. | 361/218 |

FOREIGN PATENT DOCUMENTS

EP   0 685 389 A1   12/1995

* cited by examiner

*Primary Examiner*—Ronald Leja
(74) *Attorney, Agent, or Firm*—Nixon & Vanderhye P.C.

(57) ABSTRACT

Arrangements for preventing electrical energy from lightning strikes against aircraft dissipating via aircraft fasteners 10 in an aircraft structure of composite materials in which a fastener 10 is covered with a layer of an insulating material 30 and a layer of a conductive material 32 is arranged to cover the insulating material 30 and extend over and beyond the lateral edges of the fastener 10, and preferential dielectric breakdown paths are provided at the edges of the conductive layer 32 distant from the fastener 10 so that in the event of a lightning strike electrical energy is not dissipated via the fastener 10, risking arcing and sparking, but instead from the edges of the conducting layer 32 to the underlying aircraft skin 12.

10 Claims, 1 Drawing Sheet

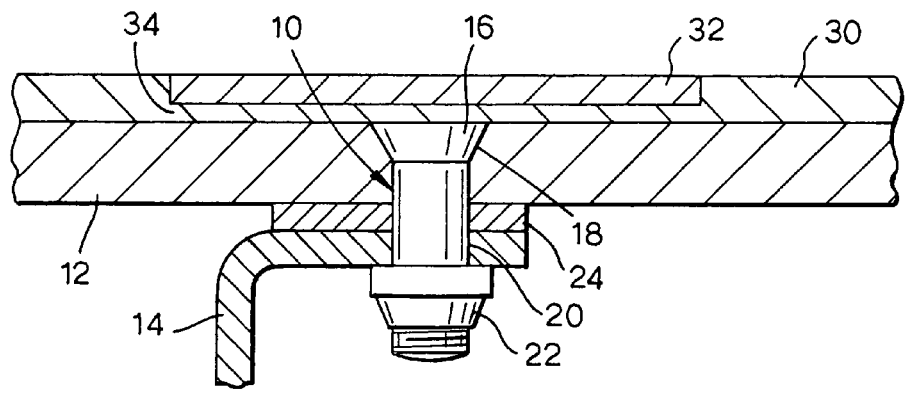
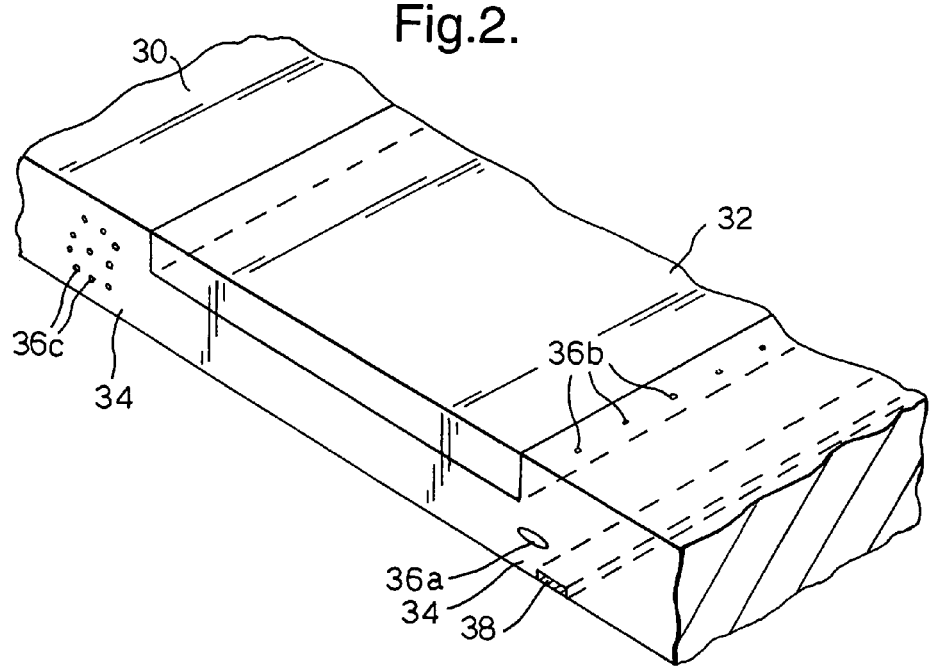

COMPOSITE STRUCTURE LIGHTING PROTECTION

This application is the US national phase of international application PCT/GB04/02105 filed 17 May 2004, which designated the US and claims priority to GB Application No. 0312339.5, filed 30 May 2003 and EP Application No. 03253384.6, filed 30 May 2003. The entire contents of these applications are incorporated herein by reference.

This invention relates to aircraft lightning protection arrangements and more particularly to methods for protecting aircraft skin panels and aircraft substructure, when the skin panels, or, both, are made from composite materials such as carbon fibre composites or hybrids of such composites and are joined together by metallic fasteners, from the adverse effects of a lightning strike which might cause arcing at the fastener.

Aircraft structures are increasingly being made of composite materials rather than the aluminium alloy and similar metallic materials formerly used, largely because composite structures have favourable strength and stiffness characteristics whilst being lighter than metallic components. However, composite materials are less capable of withstanding lightning strikes compared to metallic materials.

When an aircraft suffers a lightning strike, a high electric current, typically of the order of 100,000 amps, may flow through the aircraft structure. In a carbon fibre composite structure, the carbon fibre plies act as very high resistance conductors and the resin between the plies acts as a highly capacitive dielectric, so that a lightning strike on the composite results in an increasing potential difference produced across the ply structure but with no readily available electrically conductive path to allow the current to discharge. The current therefore tends to concentrate at the fasteners between the skin panels and the aircraft substructure and, since the fasteners are usually made of metallic alloy for strength reasons, they are consequently highly electrically conductive. When the lightning strike energy is unable to dissipate sufficiently quickly, arcing is likely to occur at the concentration points (the fasteners) and dangerous sparks may be produced.

Arcing and sparking is a dangerous problem, especially where the substructure is the wall of a fuel tank and arcing risks the projection of sparks, molten material and/or hot gases into the fuel tank, with the consequent danger of ignition of flammable fuel.

Considerable efforts have been made to provide a solution to this problem, but so far none has proved entirely satisfactory in terms of technical efficiency, reliability and ease and cheapness of manufacture.

Known methods of protecting against lightning strike include providing a conductive layer over the aircraft outer skin (the conductive layer being isolated from the fastener heads) to dispense the lightning strike energy over the surface of the aircraft; using special fasteners designed to transmit lighting strike energy safely to the substructure without arcing (see, for example, EP-B-269458 or GB-B-2212580), or providing a conductive path by way of an electrically-conductive layer in contact with the fastener to divert much of the electrical current from a lightning strike away from the fastener to minimise the likelihood of arcing occurring with the inner substructure (see EP-B-685389). Each of these methods has significant disadvantages.

The provision of an electrically conductive layer extending over substantially the entire aircraft outer surface is expensive, it adds mass without contributing to the strength of the assembled structure, and the layer is vulnerable to environmental damage and is difficult to maintain.

The use of special fasteners may be prohibitively expensive, because a typical aircraft may require many thousands of fasteners, and they also require special, and hence time-consuming and/or expensive, manufacturing techniques. The use of an electrically-conductive layer to divert lightning strike energy away from the fasteners as in EP-B-685389 is generally an effective technique, but it requires several, separate manufacturing processes which increases the cost and time of aircraft manufacture. Moreover, the methods typified in EP-B-685389 produce arrangements which, although largely effective in dissipating lightning strike energy, may not dissipate sufficient energy away from the fasteners quickly enough always to prevent arcing and sparking at the fastener.

Accordingly, the present invention provides a method of fastening an outer aircraft skin to an inner substructure, the skin or both being made of a non-metallic fibre and resin composite material, using a fastener bolt, the method including the steps of: inserting the bolt through the outer skin and the substructure and securing the bolt adjacent an inner surface of the substructure such that a bolt head abuts the outer aircraft skin; applying a layer of electrically insulating material over the bolt head and the outer aircraft skin, and incorporating an electrically-conductive layer in the outer surface of the insulating layer, the conductive layer being configured so as to overlie and having edges extending laterally of the bolt head and being separated therefrom by insulating material, the layers of insulating material adjacent the lateral edges of the conductive layer being adapted to break down dielectrically before dielectric breakdown can occur in the insulating material separating the conductive layer and the bolt head, thereby to divert electrical current from a lightning strike away from the fastener and prevent arcing at the fastener.

This invention is predicated on the concept of dissipating lightning strike energy as far as possible through a conductive layer but, in acceptance of the fact that in certain circumstances dissipation may not be sufficiently rapid, actively promoting dielectric breakdown in a region sufficiently distant from the fastener to ensure that arcing and sparking from the fastener simply cannot occur. Instead, in the event the lightning strike energy is not sufficiently dissipated by the conductive layer, dielectric breakdown allows current to flow from the edges of the conductive layer to the inner substructure, when the surplus energy dissipates sufficiently to avoid arcing and sparking.

Those skilled in the art will appreciate that there are many methods of promoting preferential dielectric breakdown in the insulating material. The insulating material may have voids or pinholes formed in it adjacent the edges of the conductive material, or it may incorporate localised doping or aggregate conductive material, or another layer or layers of conductive material may be provided on the other side of the layer of insulating material, so that dielectric breakdown occurs between the edges of the first conductive layer and the further layer(s)—which also serves further to dissipate the lightning strike energy.

Preferably the layer of insulating material, optionally including the layer of conducting material, is applied to the outer aircraft skin in the form of an appliqué layer, or strip. Appliqué coating of aircraft surfaces (which may be visualised as being similar to the application of a domestic wallpaper) is a relatively recent development; it has the advantage of being a quick and relatively inexpensive method of applying a surface coating to an aircraft. In addition, the manufacture of the appliqué layer, incorporating the conductive layer and the means for promoting preferential dielectric breakdown, can be carried out easily and in an automated process removed from the aircraft itself; as the application of appliqué to an aircraft is frequently contemplated in order to provide the aircraft with its surface coating, the application of an appliqué layer incorporating the lightning protection arrangement of the present invention is no more and no less difficult or expensive than the provision of the usual aircraft surface coating. Moreover, the appliqué coating may combine both the normal epoxy- and/or polyurethane-based paint layers (provided that these are sufficiently electrically-insulative) with the electrically-conductive layer of the present invention thereby to provide the aircraft with both its surface protection and decoration layer with lightning strike protection in a single process of applying a single appliqué strip (current techniques require a conventional primer to be used with an appliqué top coat, it may in future be possible to use an appliqué to replace both primer and top coat).

The invention also relates to a fastening obtained by any of the methods according to the invention described above. Accordingly, the invention also provides, in another aspect, a combination of an outer aircraft skin and an inner substructure, the skin or both being made of a non-metallic fibre and resin material, and a fastener bolt securing the two together and having a bolt head abutting the outer aircraft skin, wherein a layer of electrically-insulating material covers the outer aircraft skin and the bolt head and incorporates on outer layer of electrically-conductive material configured so as to overlie and have edges extending laterally of the bolt head and being separated therefrom by insulating material, the layer of insulating material adjacent the lateral edges of the conductive layer being adapted to break down dielectrically before dielectric break down can occur in the insulating material separating the conductive layer and the bolt head, thereby to divert electrical current from a lightning strike away from the fastener and prevent arcing at the fastener.

The conductive layer is preferably made of a solid or substantially solid metallic material, such as a strip of metal foil. The strip may be applied, relative to the outer aircraft skin, so as to extend over and overlie a row of bolt heads forming a line of fastenings along the outer surface or skin of the aircraft. If applied as an appliqué layer, the conductive layer may be provided in the appliqué as a plurality of metallic strips so arranged when the various appliqué strips are applied to the aircraft to form an interconnecting conductive grid extending both spanwise and chordwise of the aircraft panel to offer a larger metallic area over which lightning strike energy can be dissipated, and to overlie the grid of fasteners which frequently extend in such a manner over an aircraft's outer surface. The electrically-conductive layer, or the grid, may be connected to a metallic part of the aircraft structure to provide a route for the electrical current to pass from the composite outer surface to the metallic structure of the aircraft and thus avoid arcing and sparking, particularly in regions where this would be especially dangerous, e.g. in the vicinity of the aircraft fuel tanks.

The invention will now be described by way of example and with reference to the accompanying drawings in which:

FIG. 1 is a cross-sectional view through a fastener installed in an aircraft structure in accordance with the invention, and FIG. 2 is an enlarged schematic view of the surface coating of the arrangement of FIG. 1.

Referring to FIG. 1, a fastener 10 is shown securing a skin panel 12 of an aircraft structure to an inner substructure 14 comprising the wall of a fuel tank. Both the skin panel 12 and the substructure 14 are made of carbon fibre composite material of low weight and high strength. The fastener 10 is made of metal and comprises a bolt having a levelled head 16 which is countersunk into a corresponding shaped opening 18 in the skin panel 12, and a shank 20, which passes through the skin panel 12 and the substructure 14 to be secured by a metallic nut 22 engaging the substructure 14. The head 16 of the bolt 10 is configured when engaged in the countersunk opening 18 to be substantially flush with the outer surface of the skin panel 12 (if there is any discontinuity in the outer surface of the skin panel 12 this might contribute adversely to aerodynamic drag in flight, or to the aircraft's radar cross section, therefore the arrangement of the bolt head 16 might deliberately be such that in position it sits below the level of the outer aircraft skin 12 with the arrangement being brought flush by a suitable filler material (not shown) as is known in the art). An insulating skin 24 is interposed between the skin panel 12 and the substructure 14 as a filler, to accommodate differences in the opposed surfaces of the skin panel 12 and the substructure 14 which might lead to a varying distance there between when the two are brought into nominal contact by tightening of the fastener 10.

Subsequently, the outer aircraft structure is provided with an electrically insulating coating 30, which may comprise the layers of epoxy- and/or polyurethane-based paints normally employed to coat the aircraft exterior, to provide environmental protection for the aircraft skin 12, to improve aerodynamic drag characteristics and/or reduce radar cross section as is known in the art. Incorporated in the electrically-insulative coating layer 30 is a strip of an electrically-conductive layer 32, which is configured so as to overlie the head 16 of fastener 10 and to extend laterally (left and right in FIG. 1) of the bolt head 16. The electrically conductive layer 32 is separated from the bolt head 16 by a thickness of electrically-insulative material, and the outer surface of the conductive layer 32 is flush with the outer surface of the insulative layer 30.

It will be appreciated that FIG. 1 is not to scale, also that the extent to which conductive layer 32 extends laterally beyond the bolt head 16 will depend on such factors as the thickness of the insulative layer 30, the size of the bolt head 16 and the relative electrical conductivities of the materials of which the fastener 10, the aircraft skin panel 12, the insulative layer 30 and the conductive layer 32 are made.

The areas 34 in the insulative layer 30 adjacent the edges of the conductive layer 32 are adapted to break down dielectrically in the event of a lightning strike in preference to any dielectric breakdown between the conductive layer 32 and the bolt head 16 as will be described now with particular reference to FIG. 2.

The regions 34 adjacent the edges of the conductive layer 32 are provided with inclusions 36a, pinpricks 36b or are doped with impurities 36c to provide preferential routes for dielectric breakdown and for the dissipation of electrical energy in the event of a lightning strike, so that excess electrical energy which cannot be dissipated in the conducting layer 32 alone is dissipated via the aircraft skin 12 and the high resistance carbon fibre plies therein rather than via the highly conductive fastener 10 which would risk arcing and sparking from the nut 22 end of the fastener threatening to ignite the flammable fuel. Additionally or alternatively, further electrically conductive strips 38 (only one is shown) are provided running substantially parallel with the lateral edges of the conductive layer 32 on the other side of the insulative layer 30, to encourage any electrical energy dissipated through the insulative layer 30 by dielectric breakdown to dissipate via the strips 30 and further reduce the dangers of arcing and sparking inside the aircraft.

As is described above, the coating layers 30, 32, 38 are suitably applied in the form of an appliqué strip.

It will be apparent that the present invention, being predicated on the concept of providing preferential dielectric breakdown paths for the discharge of lightning strike electrical energy which are removed from the vicinity of the underlying metallic fastener, is not limited to the specific embodiments illustrated. For example, the fastener 10 may be any conventional fastener, and the nut 22 may be in direct or indirect contact with the substructure 14. The layers 30, 32 of insulative and conductive material may be further protected by outer paint layers, and the solid metal strip 32 may be pierced by occasional, relatively small openings, provided the density or cross-sectional area of the strip remains sufficient to establish a safe conductive path for dissipating lightning energy. The invention is also applicable where the inner substructure 14 is of metallic rather than composite material.

The invention claimed is:

1. A method of fastening an outer aircraft skin to an inner substructure, the skin or both being made of a non-metallic fibre and resin composite material, using a fastener bolt, the method including the steps of: inserting the bolt through the outer skin and the substructure and securing the bolt adjacent an inner surface of the substructure such that a bolt head abuts the outer aircraft skin; applying a layer of electrically insulating material over the bolt head and the outer aircraft skin, and incorporating an electrically-conductive layer in the outer surface of the insulating layer, the conductive layer being configured so as to overlie and having edges extending laterally of the bolt head and being separated therefrom by insulating material, the layer of insulating material adjacent the lateral edges of the conductive layer being adapted to break down dielectrically before dielectric breakdown can occur in the insulating material separating the conductive layer and the bolt head, thereby to divert electrical current from a lightning strike away from the fastener and prevent arcing at the fastener.

2. A method as claimed in claim 1 comprising forming voids, inclusions or pinholes in the layer of insulating material in the regions adjacent the edges of the conductive material to promote dielectric breakdown thereat.

3. A method as claimed in claim 1 comprising including localised doping in the layer of insulating material in the regions adjacent the edges of the conductive material to promote dielectric breakdown thereat.

4. A method as claimed in claim 1 comprising providing two further layers of electrically-conductive material contiguous with the insulating material and the outer aircraft skin and in the regions adjacent the edges of the conductive material to promote dielectric breakdown so that electrical current flows through the insulating material from the edges of the conductive material to the further layers of conductive material.

5. A method as claimed in claim 1 comprising applying the layer of insulating material in the form of an appliqué layer.

6. A combination of an outer aircraft skin and an inner substructure, the skin or both being made of a non-metallic fibre and resin material, and a fastener bolt securing the two together and having a bolt head abutting the outer aircraft skin, wherein a layer of electrically-insulating material covers the outer aircraft skin and the bolt head and incorporates a layer of electrically-conductive material configured so as to overlie and have edges extending laterally of the bolt head and being separated therefrom by insulating material, the layers of insulating material adjacent the lateral edges of the conductive layer being adapted to breakdown dielectrically before dielectric break down can occur in the insulating material separating the conductive layer and the bolt head, thereby to divert electrical current from a lightning strike away from the fastener and prevent arcing at the fastener.

7. A combination as claimed in claim 6 wherein the conductive layer is of solid or substantially solid metallic material.

8. A combination as claimed in claim 6 wherein the conductive layer comprises a strip which is applied relative to the outer aircraft skin so as to extend over and overlie a row of bolt heads forming a line of fastenings along the outer surface skin.

9. A combination as claimed in claim 6 comprising providing two further layers of electrically-conductive material contiguous with the insulating material and the outer aircraft skin and in the regions adjacent the edges of the conductive material to promote dielectric breakdown so that electrical current flows through the insulating material from the edges of the conductive material to the further layers of conductive material.

10. A combination as claimed in claim 6 wherein the layer of insulating material comprises an appliqué layer, the conductive layer being incorporated in the appliqué layer.

* * * * *